(12) United States Patent
Potter

(10) Patent No.: US 6,425,607 B1
(45) Date of Patent: Jul. 30, 2002

(54) CONNECTOR FOR PIPE SECTIONS

(75) Inventor: Richard M. Potter, Humble, TX (US)

(73) Assignee: R. Potter Consulting, Inc., Humble, TX (US)

( * ) Notice: Subject to any disclaimer, the term of this patent is extended or adjusted under 35 U.S.C. 154(b) by 0 days.

(21) Appl. No.: 09/802,762

(22) Filed: Mar. 9, 2001

(51) Int. Cl.[7] .............................................. F16L 35/00
(52) U.S. Cl. ...................... 285/34; 285/33; 285/307; 285/322; 285/332.4; 285/334.1
(58) Field of Search .......................... 285/33, 34, 321, 285/322, 332.4, 334.1, 334.2, 307

(56) References Cited

U.S. PATENT DOCUMENTS

| | | | |
|---|---|---|---|
| 1,071,921 A | * | 9/1913 | Hilton ........................... 285/34 |
| 3,284,105 A | * | 11/1966 | Leutwyler ..................... 285/34 |
| 4,378,187 A | | 3/1983 | Fullerton |
| 5,324,150 A | | 6/1994 | Fullerton |
| 5,378,100 A | | 1/1995 | Fullerton |
| 5,427,488 A | | 6/1995 | Fullerton et al. |
| 5,580,200 A | | 12/1996 | Fullerton |
| 5,613,816 A | | 3/1997 | Cabahug |
| 5,733,084 A | | 3/1998 | Fullerton |
| 5,788,443 A | | 8/1998 | Cabahug |
| 5,800,108 A | | 9/1998 | Cabahug |

* cited by examiner

*Primary Examiner*—Lynne H. Browne
*Assistant Examiner*—Aaron M Dunwoody
(74) *Attorney, Agent, or Firm*—Browning Bushman P.C.

(57) ABSTRACT

A connecter (30) for connecting a pair of pipe sections (32,33) together. The connector (30) includes three internally threaded segments (58) which are mounted for sliding radial movement in the connector (30). The connector (30) is first mounted on an internally threaded female end (34) of one pipe section (32) and then the male end (40) of the other pipe section (33) is forced within the internally threaded segments (58) for threaded engagement.

14 Claims, 2 Drawing Sheets

CONNECTOR FOR PIPE SECTIONS

FIELD OF THE INVENTION

This invention relates to a connector for pipe sections and more particularly to a connector mounted in the female end of one pipe section for connecting the male threaded end of a second pipe section to the connector.

BACKGROUND OF THE INVENTION

Heretofore, quick acting nut or coupling assemblies have been provided in which a threaded nut is quickly positioned on a threaded bolt by pushing of the nut onto the bolt. A jam nut comprising three separate segments which may expand radially are provided. The segments have a radial spring to urge the segments radially inwardly as the segments slide along an inclined or frustoconical surface into and out of engagement with the threads on the externally threaded bolt. For example, U.S. Pat. No. 5,324,150 dated Jun. 28, 1994 shows a quick acting nut assembly in which three radially inwardly biased arcuate segments are provided to engage the threads of a bolt. The arcuate threaded segments are positioned within a casing and frustoconical surfaces are provided between the segments and the outer casing for radial sliding movement of the segments. A radial spring urges the segments into engagement with the external threads on the mounted bolt. An outer cap is provided to hold the segments within the casing and is secured to the outer casing. Detents are provided for the three arcuate segments to retain the segments against rotation within the outer casing. The arcuate segments have an enlarged diameter upper end portion and engage the outer casing along two spaced frustoconical surfaces for support. The segments slide along the pair of inclined or frustoconical surfaces of the casing for inward and outward radial movement relative to the externally threaded male member.

It is desired that a quick acting coupling be provided between a pair of pipe sections to permit an upper pipe section to be quickly connected to a lower pipe section.

SUMMARY OF THE INVENTION

The present invention is particularly directed to a connector or coupling for connecting a pair of pipe sections to each other. The connector is first threaded into an internally threaded end of the lower pipe section and then the upper externally threaded end of the upper pipe section is pushed or lowered within the internally threaded end of the connector. To obtain a fast acting connection of the upper pipe section, three or more radially inwardly biased arcuate female segments are mounted within the casing of the connector for inward and outward sliding radial movement along an inclined frustoconical surface of the casing. The segments have a large diameter lower end portion to provide a relatively large lower end surface for contacting the frustoconical surface of the casing. Radial springs about the segments urge the segments radially inwardly. Detents integral with the body of the casing are secured within grooves of the segments to keep the segments from rotating relative to the connector upon engagement with the externally threaded pipe section.

An upper cap having an inclined lower surface contacts the upper inclined surface of the segments to hold the segments in position in the outer casing and to permit inward and outward radial movement of the arcuate segments. The upper pipe section may be secured within the internally threaded female end of the connector with the radial spring holding the female threads on the connector and the male threads on the upper pipe section in mating engagement. For removal, a reverse rotation of the upper pipe section unthreads the upper pipe section from the connector. A relatively large lower frustoconical surface extending inwardly from inner peripheral surface of the connector supports the arcuate segments for sliding movement and provides a bearing surface to facilitate sliding movement of the arcuate segments.

It is an object of the present invention to provide a quick acting coupling or connector for connecting the pipe sections to each other.

DESCRIPTION OF THE INVENTION

Figure 1:
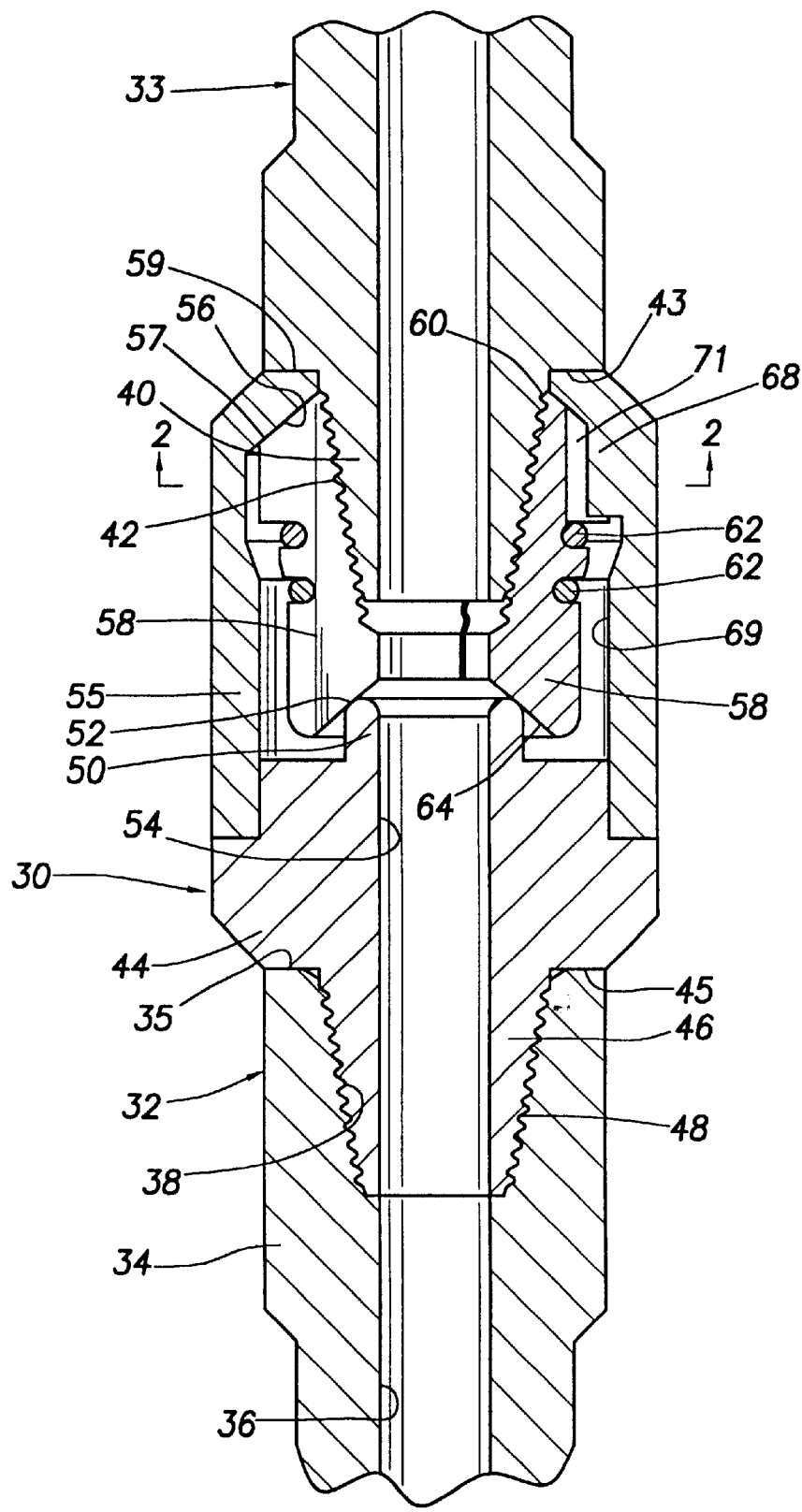
FIG. 1 is a longitudinal sectional view of a coupling comprising the present invention and showing an upper pipe section received within the coupling which is threaded within an internally threaded lower pipe section.
Figure 2:
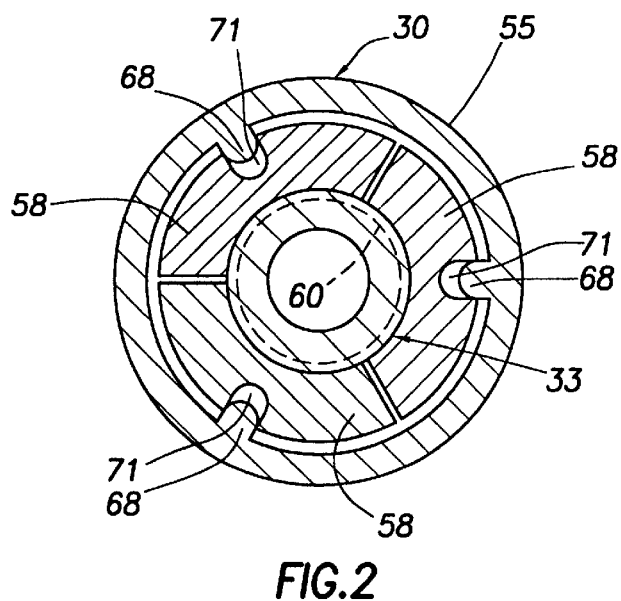
FIG. 2 is a cross sectional view taken generally along line 2—2 of FIG. 1.

The present invention is particularly directed to a coupling or connector generally indicated at 30 for coupling lower pipe section 32 to upper pipe section 33. Pipe sections 32 and 33 may comprise drill pipe having a length of forty (40) feet and around three and one half (3½) inches in external diameter. Lower pipe section 32 has an upset end or box 34 with an annular upper shoulder 35 and a central bore 36 including tapered internal end screw threads 38. Upper pipe section 33 has a tapered end portion or pin 40 having external screw threads 42 and an annular shoulder 43. It is desirable to connect pipe sections 32 and 33 to each other and connector or coupling 30 is effective for connecting pipe sections 32 and 33 to each other.

Figure 3:
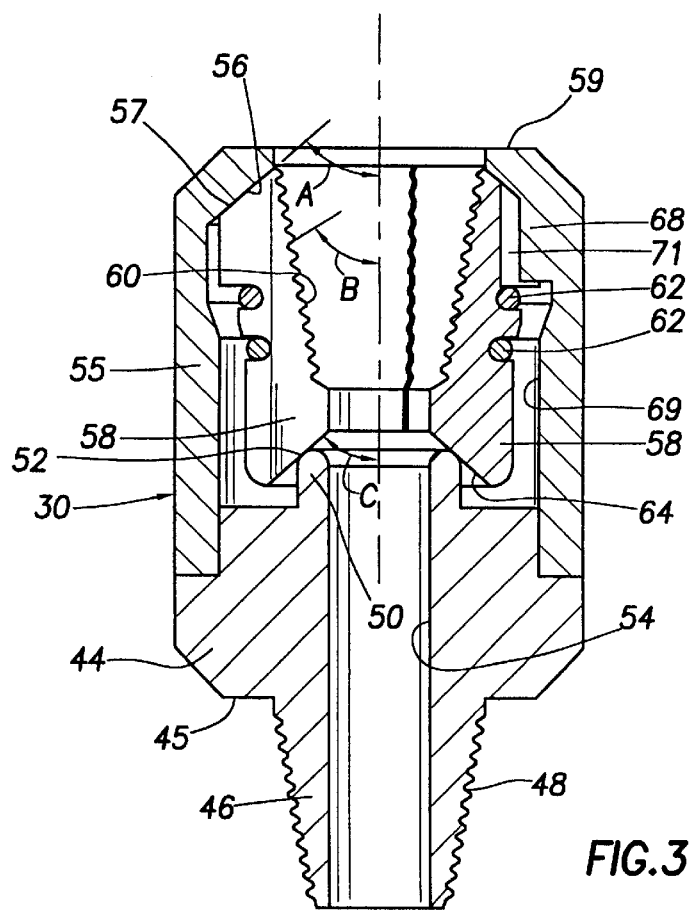
FIG. 3 is a longitudinal sectional view of the connector shown in FIGS. 1 and 2 with the pipe sections removed from the connector.

Coupling or connector 30 has a body 44 with an extending externally threaded tapered end portion 46 on one end having external screw threads 48 and a shoulder 45. The other end has an annular rim or lip 50 with a beveled end 52 about a central bore 54 in axial alignment with bore 36 of pipe section 32. A sleeve or casing generally indicated at 55 is secured to body 44 and has an inner frustoconical surface 56 extending at an angle A with respect to the longitudinal axis of coupling 30. Casing 55 has an upper end 59. Fitting within casing 55 are three arcuate segments 58 having internal screw threads 60 extending at an angle B relative to the rotational or longitudinal axis of connector 30 as shown in FIG. 3. Angle B is greater than angle A. For example, angle A may be about 50 degrees and angle B about 60 degrees. Since angle B is greater than angle A, an improved threaded connection is obtained between screw threads 42 on pipe section 33 and screw threads 60 on arcuate segments 58. Also, the angle variance between threads 60 and lower frustoconical surface 56 prevent segments 58 from disengaging pipe section 33 until a rotation of 270 degrees is provided between connector 30 and pipe section 33. A pair of radial springs 62 extend about segments 58 and continuously urge segments 58 radially inwardly into tight contact with pipe section 33 when pipe section 33 is mounted within segments 58 as shown in FIG. 1. Segments 58 have upper outer frustoconical surfaces 57 and lower inner frustoconical surfaces 64. Outer frustoconical surfaces 57 extend at the same angle as frustoconical surface 56. The inner frustoconical surfaces 64 of segments 58 extend at an angle C relative to the longitudinal axis of connector 30. Angle C is generally the same as angle A and may be about 50 degrees. The arcuate end 52 of annular lip or rim 50 contacts the inner ends 64 of arcuate segments 58 to provide minimal frictional contact upon radial movement of arcuate segments 58 inwardly and outwardly during operation of connector 30. To restrain relative rotation of segments 58 relative to sleeve 54, detents 68 extend radially inwardly from the inner peripheral surface 69 of casing 55 and are formed integrally with casing 55. Detents 68 are received within grooves 71 in arcuate segments 58 for rotation of segments 58 with casing 55.

Operation

When pipe sections 32 and 33 are utilized as drill pipe for lowering within a bore hole, connector 30 is preferably connected to lower pipe section 32 before pipe section 32 is lowered within the bore hole. After pipe section 32 of a drill string is lowered within a bore hole with connector 30 tightly secured thereto, pipe section 33 is then lowered onto the drill string. The weight of pipe section 33 when pin 40 is in axial relation with arcuate segments 58 and received therein forces segments 58 radially outward with lower surfaces 57 of segments 58 sliding along frustoconical surface 56. Upon abutting engagement of shoulder 43 with shoulder 59 the downward movement of pipe section 33 is stopped and arcuate segments 58 are urged by radial springs 62 into threaded engagement with pin 40. Subsequent rotation of pipe section 33 relative to connector 30 results in a tight connection between connector 30 and pipe section 33 with connector 30 tightly gripping pipe section 33. After connection of pipe section 33 the drill string may be lowered within the bore hole and additional pipe sections may be added. Each pipe section has a pipe on one end and a box or upset end on the opposite end. To disconnect pipe section 33 from pipe section 32, pipe section 33 may be rotated in a reverse direction for unthreading of pipe section 33 from connector 30.

It will be understood by those skilled in the art that the embodiment shown and described is exemplary and various other modifications may be made in the practice of the invention. Accordingly, the scope of the invention should be understood to include such modifications which are within the spirit of the invention.

What is claimed is:

1. A connector for connecting a pair of adjacent pipe sections to each other, one pipe section having an externally threaded tapered male end and an inner annular shoulder extending about said tapered end, the other pipe section having an internally threaded tapered female socket and an outer annular end shoulder extending about said socket; said connector comprising:
   a body having on one end an extending externally threaded tapered male end in threaded engagement with said internally threaded tapered female socket, and having on an opposite end a sleeve;
   at least three internally threaded arcuate segments mounted within said sleeve for engaging said externally threaded male end on said one pipe section, said sleeve including an inner frustoconical surface engaging said segments to permit relative sliding movement of said segments radially outwardly upon receiving said externally threaded male end of said one pipe section; and
   spring means biasing said segments radially inward to urge said arcuate segments into threaded engagement with said male end on said one pipe section.

2. The connector as set forth in claim 1, wherein said body has an annular shoulder about said male end in abutting relation with said outer shoulder on said other pipe section.

3. The connector as set forth in claim 2, wherein said arcuate segments have frustoconical inner end surfaces and said body has an annular rim engaging said frustoconical end surfaces.

4. The connector as set forth in claim 3, wherein said rim has a beveled end engaging said frustoconical inner end surfaces of said arcuate segments and permitting sliding movement of said segments along said rim.

5. The connector as defined in claim 1, wherein said spring means comprises a pair of annular springs extending about said arcuate segments to urge continuously said segments radially inwardly.

6. A pipe joint comprising:
   a first pipe section having an internally threaded tapered female end and an outer annular end shoulder extending about said female end;
   a second pipe section having an externally threaded tapered male end and an outer annular end shoulder extending about said tapered male end;
   a connector fitting between said annular end shoulders on said pipe sections for connecting said pipe sections together; said connector including:
      a body having an outer sleeve on one end and an externally threaded tapered male end on the opposite end generally identical to said tapered male end of said second pipe section;
      at least three internally threaded arcuate segments mounted within said sleeve for engaging said externally threaded tapered male end on said second pipe section, said sleeve including an inwardly extending frustoconical surface engaging said segments to permit sliding radial movement of said segments; and
      spring means biasing said segments radially inward to urge said arcuate segments into threaded engagement with said male end on said second pipe section.

7. The pipe joint as defined in claim 6, further comprising;
   an annular shoulder about said male end on said body in abutting relation with said outer annular shoulder about said female end of said first pipe section.

8. The pipe joint as defined in claim 7, further comprising;
   an annular shoulder on an outer end of said sleeve in abutting engagement with said outer annular end shoulder about said tapered male end of said second pipe section.

9. The pipe joint as defined in claim 8, whereas said arcuate segments have
   frustoconical inner end surfaces and said body has an annular rim engaging said frustoconical end surfaces.

10. A method for connecting a pair of adjacent upper and lower pipe sections to each other, each pipe section having an externally threaded male end and an upset internally threaded female end; said method comprising:
   providing a connector having an extending externally threaded male end on one end thereof substantially identical to said externally threaded male ends on said pipe sections;
   mounting a plurality of internally threaded arcuate segments within said connector for inward and outward radial movement;
   resiliently urging said arcuate segments radially inwardly;
   threading said male end of said connector within the internally threaded female end of a lower pipe section;
   forcing the externally threaded male end of an upper pipe section longitudinally within said arcuate segments with said arcuate segments engaging said male end of said upper pipe section in a threaded relation; and then rotating said upper pipe section relative to said connector for tightly engaging said arcuate segments with said upper pipe section.

11. The method as defined in claim 10 wherein the step of forcing said externally threaded male end of said upper pipe section within said segments includes pushing said male end against a shoulder on said connector.

12. The method as defined in claim 10 including providing frustoconical surfaces on said connector to engage frustoconical surfaces on said arcuate segments to permit sliding radial movement of said arcuate segments into and out of engagement with said externally threaded male end of said upper pipe section.

13. A method for connecting a pair of upper and lower pipe sections to each other in end to end relation, the upper pipe section having a male end with tapered external threads and the lower pipe section having a female end with tapered internal threads;

providing a connector having a lower externally threaded male end substantially identical to said male end on said upper pipe section and a plurality of internally threaded arcuate segments within said connector having tapered internal screw threads for engaging said tapered external threads on said male end of said upper pipe section;

urging said arcuate segments radially inwardly;

threading said male end of said connector within said female end of said lower pipe section for tightly mounting of said connector onto said lower pipe section;

urging said male end of said upper pipe section axially within said arcuate segments with said tapered internal screw threads of said arcuate segments engaging said male end of said upper pipe section in threaded relation; and then rotating said upper pipe section relative to said arcuate segments for tightly engaging said arcuate segments thereby to provide a tight connection between said upper pipe section and said connector.

14. The method as defined in claim 13, wherein the urging of said male end of said upper pipe section within said segments includes pushing said male end against a shoulder on said connector.

\* \* \* \* \*